(12) United States Patent
Becher et al.

(10) Patent No.: US 6,862,899 B2
(45) Date of Patent: Mar. 8, 2005

(54) METHOD AND APPARATUS FOR HEATING GLASS MELTING FURNACES WITH FOSSIL FUELS

(75) Inventors: Jürgen Becher, Weinböhla (DE); Manfred Wagner, Lohr am Main (DE)

(73) Assignee: Beteiligungen Sorg GmbH & Co. KG, Lohr am Main (DE)

( * ) Notice: Subject to any disclaimer, the term of this patent is extended or adjusted under 35 U.S.C. 154(b) by 278 days.

(21) Appl. No.: 10/121,339

(22) Filed: Apr. 12, 2002

(65) Prior Publication Data
US 2002/0152770 A1 Oct. 24, 2002

(30) Foreign Application Priority Data
Apr. 18, 2001 (DE) .......................................... 101 18 880

(51) Int. Cl.[7] ................................................. C03B 5/16
(52) U.S. Cl. ........................ 65/134.4; 65/134.6; 65/337; 431/2; 432/159; 432/195; 432/196; 432/180
(58) Field of Search .............................. 65/134.4, 134.6, 65/337; 431/2; 432/159, 195, 196, 180

(56) References Cited

U.S. PATENT DOCUMENTS

| 5,755,846 A | 5/1998 | Wagner et al. |
| 5,820,651 A | 10/1998 | Quirk |
| 6,047,565 A | 4/2000 | Moreau |

FOREIGN PATENT DOCUMENTS

| DE | 42 44 068 C1 | 4/1994 |
| EP | 0 939 059 A2 | 9/1999 |

OTHER PUBLICATIONS

HVG–Mitteilung Nr. 1894, Mar. 19, 1997.
Kontinuierliche luftstufung: Publication from GASWÄRME International 49, Apr./May, 2000.
The second generation of the SORG® Cascade Heating System for reducing $NO_x$ in combination with additional primary measures. Sep., 2000.
HVG—Mitteilung Nr. 1127, Dec. 1969.

Primary Examiner—Mark Halpern
(74) Attorney, Agent, or Firm—Sonnenschein Nath & Rosenthal LLP

(57) ABSTRACT

During the heating of glass melting furnaces having a combustion chamber with regenerators for preheating oxidation gases, with port necks that open into the combustion chamber, with primary burners and with secondary burners that are installed in a cascade arrangement relative to the primary burners, the secondary burners are operated as cascade burners with a relatively low proportion of the fuel, the secondary fuel. Flames are thereby created in over- and sub-stoichiometric conditions and the flame gases formed are mixed with one another so that the complete combustion process in the combustion chamber is more or less stoichiometric. The secondary fuel is supplied by the secondary burners to a step, installed in the port neck. In order to prevent or reduce soot and graphite deposits in the step without increasing the nitrogen oxide content in the furnace waste gases, a secondary oxidation gas is blown into step during the firing phase of each port neck in addition to the primary oxidation gas preheated in the regenerators that flows over the step. If significant deposits of carbon material and/or temperature problems occur, then in a similar way an oxidation gas can be blown in during the exhaust phase for the furnace waste gases of each port neck when the secondary burner is switched off.

15 Claims, 4 Drawing Sheets

METHOD AND APPARATUS FOR HEATING GLASS MELTING FURNACES WITH FOSSIL FUELS

This application claims priority for application P 101 18 880.3-45 filed in Germany on Apr. 18, 2001.

BACKGROUND OF THE INVENTION

The invention concerns a method and apparatus for heating glass melting furnaces.

The main problems in the construction and operation of glass melting furnaces concern not only a reduction in the specific energy consumption per ton of glass (energy optimization), but also a reduction in the environmental emissions and retention of the furnace condition. The most polluting components in the waste gases are $NO_x$ and CO, both highly poisonous compounds, and also soot and hydrocarbons.

In order to provide a better understanding of the problems which arise in glass melting furnaces where air is preheated in regenerators, the following relationships are explained. Pairs of burner ports are operated in a rhythmic reversing cycle. This applies to U-flame furnaces, in which the burner ports are installed adjacent to one another at one end of the furnace, and also to cross-fired furnaces, where the burner ports are installed on opposite sides of the furnace. During the firing phase, fuel is mixed with the preheated combustion air from the corresponding regenerator and heats the furnace. Simultaneously, heat is removed from the material forming the regenerator. During the reversed phase, the very hot furnace waste gases are led back to the same regenerator through the same burner port, and the regenerator material is heated up again, and so on.

However, if sub-stoichiometric (fuel rich) conditions exist in or near the flame, soot is formed that is deposited in the area of the burner ports or port necks. On the one hand, with sub-stoichiometric conditions in or near the flames, followed by stoichiometric completion of the combustion, a desirably low $NO_x$ content is achieved in the waste gases. On the other hand, undesirable soot is formed locally. These problems and the measures for avoiding them are, to a certain extent, diametrically opposed and the invention presented here attempts to find an advantageous method of solving the problems.

In the HVG-Mitteilung (=HVG-Newsletter) No. 1894 (pages 1894-1 to 1894-20) Jütte writes about a paper given at the Technical Committee VI (=Fachausschuss) of the German Glass Technical Society (=DGG) in Würzburg on $19^{th}$ Mar. 1997 under the title "Experiences with primary side $NO_x$ reduction measures on a regenerative cross-fired furnace", stating that the greatest influence on the formation of NO is the temperature, which often masks the influence of the oxygen concentration.

When writing in the HVG-Mitteilung (=HVG-Newsletter) No. 1127 (pages 261 to 275) about a paper given on $20^{th}$ Oct. 1969 Hein and Leuckel had previously stated that only flames with early and stable ignition exhibit strong carbon radiation. Special burners and their operating parameters are quoted as remedial measures.

GASWÄRME International (=Gas Heat International)-49 (2000) issue 4/5-April/May (pages 207 to 212) contains an article by Ahmad Al-Halbouni with the title: "Continuous air graduation: A new way of controlling the combustion and emissions behavior of gas flames". On page 208 a diagram is used to explain an "NO—CO relationship", whereby the diagram shows clearly that at low temperatures in the combustion chamber CO, soot and $C_xH_x$ are the most common products, while at high temperatures thermal NO and NO from $N_2O$ predominate. It would therefore appear that the possibilities for reducing these components by varying the temperature in the combustion chamber contradict one another. Special burners and their operating parameters as remedial measures are also quoted here.

Further melting parameters of glass melting furnaces must also be taken into consideration, such as the melting out of the charging material (batch, glass cullet), which floats on the melt, the subsequent refining and conditioning of the melt and the adjustment of the optimum melt temperature for the further processing of the glass.

From patent DE 42 18 702 C2 and the corresponding EP 0 577 881 B1 and U.S. Pat. No. 5,755,846 it is known that, in order to reduce the nitrogen oxide emissions in glass melting furnaces heated with fossil fuels, flames with either over-stoichiometric (oxygen rich) or sub-stoichiometric (fuel rich) mixtures of fuel and oxidation gases with a cascaded flame arrangement can be created, whereby when the combustion gases have been mixed, the complete combustion process is more or less stoichiometric. The primary fuel, the largest component of the fuel requirement, is supplied through underport burner nozzles and the secondary fuel is supplied through burner nozzles, the so-called cascade burners, installed in the sides of the so-called burner ports, through which all the pre-heated combustion air from the regenerators flows into the combustion chamber above the underport burners. Although this method still operates successfully, the glass industry is now looking for a further improvement in combustion behavior. The combustion air has the tendency to divert the flame from the cascade burner shortly after entry into the combustion chamber, thereby making it more difficult to mix the gases in the flames.

From patent DE 42 44 068 C1 it is known that, in order to reduce nitrogen oxides in the waste gases of a glass melting furnace, a stepped area with two side walls can be installed at the furnace end of the port neck, and a gaseous fuel blown into the stepped area from at least one side through a fuel gas nozzle. The edge of the step causes a disturbance in the flow and a vortex in the combustion air supplied through the port neck, and pre-combustion in the form of a rolling flame is created with insufficient air, i.e., sub-stoichiometric combustion, the flue gases and flames of which lie as a dividing layer between the combustion air supplied through the port neck and the at least one flame of the relevant underport firing, whereby the combustion of the fuel from the underport burners is delayed. The resulting reduction in the highest temperatures leads to the aforementioned reduction in the formation of nitrogen oxides. However, it has been shown that, as a result of the lack of air in the rolling flame, soot is formed which is deposited as an increasingly thick graphite layer in the stepped area. When the firing is reversed, graphite flakes break off from time to time and are drawn in the opposite direction to the previous air flow through the port neck into the regenerator, where they collect. The regenerator is normally connected to a high-voltage electrostatic precipitator, and graphite particles which finally reach the electrostatic precipitator cause short circuits.

From the paper by Becher and Wagner "The second generation of the SORG® Cascade Heating System for reducing $NO_x$ in combination with additional primary measures" presented to the Technical Committee VI (=Fachausschuss) of the German Glass Technical Society (=DGG) on $10^{th}$ Oct. 2000 in Würzburg, it is further known that cascade burners can be installed in the side wall of a step, which extends across the end of the burner port just before said burner port opens into the furnace. This produces an area sheltered from the combustion air, allowing the cascade flame to increase in length across the burner port and improves the mixing of the flame gases.

However, operation of such systems has shown that soot deposits form in the burner ports and in the steps on the firing side, where the soot deposits sinter to form graphite layers. Alternating firing reversal takes place in such furnaces, which can be either U-flame or cross-fired installations, and these graphite layers tend to break off as a result of thermal deformation when the firing is reversed, so that graphite splinters collect in the regenerators. These splinters are swept by the high velocity waste gases into the electric particle separator connected to the regenerator, where they can cause short circuits. Therefore it was considered for some time whether a higher nitrogen oxide content in the waste gases should be permitted in order to reduce the graphite formation, as it can be presumed that these demands are basically diametrically opposed.

From U.S. Pat. No. 6,047,565 concerning the reduction of the $NO_x$ content in the waste gases of glass melting furnaces, it is known, amongst other things, that it is possible to install underport firing for the primary fuel in the lower area of a port neck below a step and to install secondary burners for the secondary fuel, amounting to 5 to 30% of the primary fuel, in a side wall or in the vertical step wall. In order to separate the lower flame of the primary fuel from the upper flame of the secondary fuel along part of the flame path, the installation of nozzles in the vertical step wall is recommended, through which an inert buffer gas, which, for example, could be carbon dioxide, is blown. As an alternative to the buffer gases, which are inert to combustion, waste gases and smoke from the furnace are suggested. On no account should these buffer gases be part of the combustion, so that the flame length and the burn-out are diverted to the center of the furnace and the flames become broader. Oxygen or gases such as air which contain oxygen are excluded as buffer gases.

Where oxygen lances are recommended, they must be installed immediately above and parallel to the glass surface and below the underport firing, so that the flame from the underport firing is diverted more to the center of the furnace in order to prevent a reducing atmosphere above the glass bath surface and discoloration of the glass. It is also stated that some of the fuel burners of the underport firing can be replaced by oxygen lances. However the total oxygen quantities emanating from the port necks and the oxygen lances must be adjusted so that the amount of oxygen supplied is less than that necessary for stoichiometric combustion.

No mention is made of either the problem of preventing or reducing soot deposits in the port necks, or the possibility of using combustion to destroy carbon deposits in the port necks and in the regenerators which may occur when the waste gas direction is reversed, which would prevent the electrostatic precipitators from being damaged by carbon splinters. In particular neither oxygen nor a gas containing oxygen, which could produce this effect, is supplied to the step described. This known solution is neither intended for nor is it suitable for this.

SUMMARY OF THE INVENTION

An object of the invention is therefore to present a cascade heating system for glass melting furnaces, in which the formation of soot and graphite is reduced as far as possible or prevented completely, without an inadmissible increase in the nitrogen oxide content in the waste gases from the furnace.

The object of the invention is accomplished completely by the aforesaid method by blowing a secondary oxidation gas into the step in addition to the primary oxidation gas that flows over the step from the regenerators during the firing phase.

An apparatus embodying the invention further includes at least one supply apparatus, being either an oxidation lance or an opening, for the supply of secondary oxidation gases through at least one of the defining walls of the step. The reversal system for the furnace is designed such that the supply of secondary oxidation gases into the step during the return flow of the furnace waste gases from the combustion chamber into the corresponding regenerator can be selectively switched on, or switched off or varied in a controlled manner.

This object of the invention is accomplished completely by these solutions. Initially the secondary fuel, which has a lower linear momentum than the primary fuel supplied through the primary burners, is supplied through the side burners, the cascade burners, in the lee of the step or step wall, which can also be described as a "baffle wall". The soft and wide cascade flame thus created covers the primary flame(s) of the underport firing across the complete port neck width and reduces the core temperature of the primary flame considerably, which results in a reduction in $NO_x$ formation.

However, the additional provision or inlet of secondary oxidation gas in the step results in the following additional unexpected advantages:

prevention of soot or graphite and, if necessary, the oxidation of these carbons, afterburning of CO and other carbon compounds, use of individual fan control to influence the effect of the secondary oxidation gases.

As a result of further embodiments of the method according to the invention it is particularly advantageous if, either individually or in combination:

during the waste gas exhaust phase of each port neck an oxidation gas from the group air, oxygen-enriched air and oxygen is also blown into the step when the secondary burner is switched off (advantage: thermal protection of the secondary burners on the exhaust side; oxidation of any existing carbon deposits), the secondary oxidation gas is introduced through the center of the secondary burner into the step, the secondary oxidation gas is introduced outside the secondary burner through the side wall into the step, the secondary oxidation gas is introduced into the step through the bottom of said step, the secondary oxidation gas is introduced into the step immediately in front of the wall of said step, the secondary oxidation gas is introduced into the step through the wall of said step, the secondary oxidation gas is introduced into the step through both the bottom and walls of said step, fuel is mixed with the secondary oxidation gas, when gaseous fuels are used, the ratio of the amount of secondary fuel to the amount of primary fuel is between 5 and 30 volume percent, preferably between 10 and 20 volume percent, during the firing phase the ratio of the oxygen content of the secondary oxidation gas introduced into the step to the oxygen content of the primary oxidation gas preheated in the regenerators and introduced through the port neck is between 0.5 and 2.5, the ratio of the secondary oxidation gas introduced into the step during the firing phase to the secondary oxidation gas introduced into the step during the exhaust phase is between 0.5 and 1.5, preferably between 0.8 and 1.2, and/or, if the ratio of the secondary oxidation gases is controlled by a variable fan.

As a result of further embodiments of the apparatus according to the invention, it is particularly advantageous if, either individually or in combination:

an oxidation gas lance is provided in the center of the secondary burner for the supply of secondary oxidation gas into the step, an oxidation gas lance is provided in the side wall outside of the secondary burner for the supply of secondary oxidation gas into the step, at least one opening for the supply of secondary oxidation gas into the step is provided in the bottom of the step, in particular if the at least one opening is provided immediately in front of the wall of the step, at least one opening for the supply of secondary oxidation gas into the step is provided in the wall of the step, at least one opening for the supply of secondary oxidation gas into the step is provided in both the bottom and the wall of the step, a refractory block is provided on the step at the end of step opposite the secondary burner to protect the side wall of the port neck from the flame from the secondary burner, and/or, if variable fans are provided for the supply of the secondary oxidation gases into the step.

BRIEF DESCRIPTION OF THE DRAWINGS

One embodiment of the invention and its function are described in more detail with reference to FIGS. 1–4. The figures show.

DETAILED DESCRIPTION OF THE PREFERRED EMBODIMENTS

Figure 1:
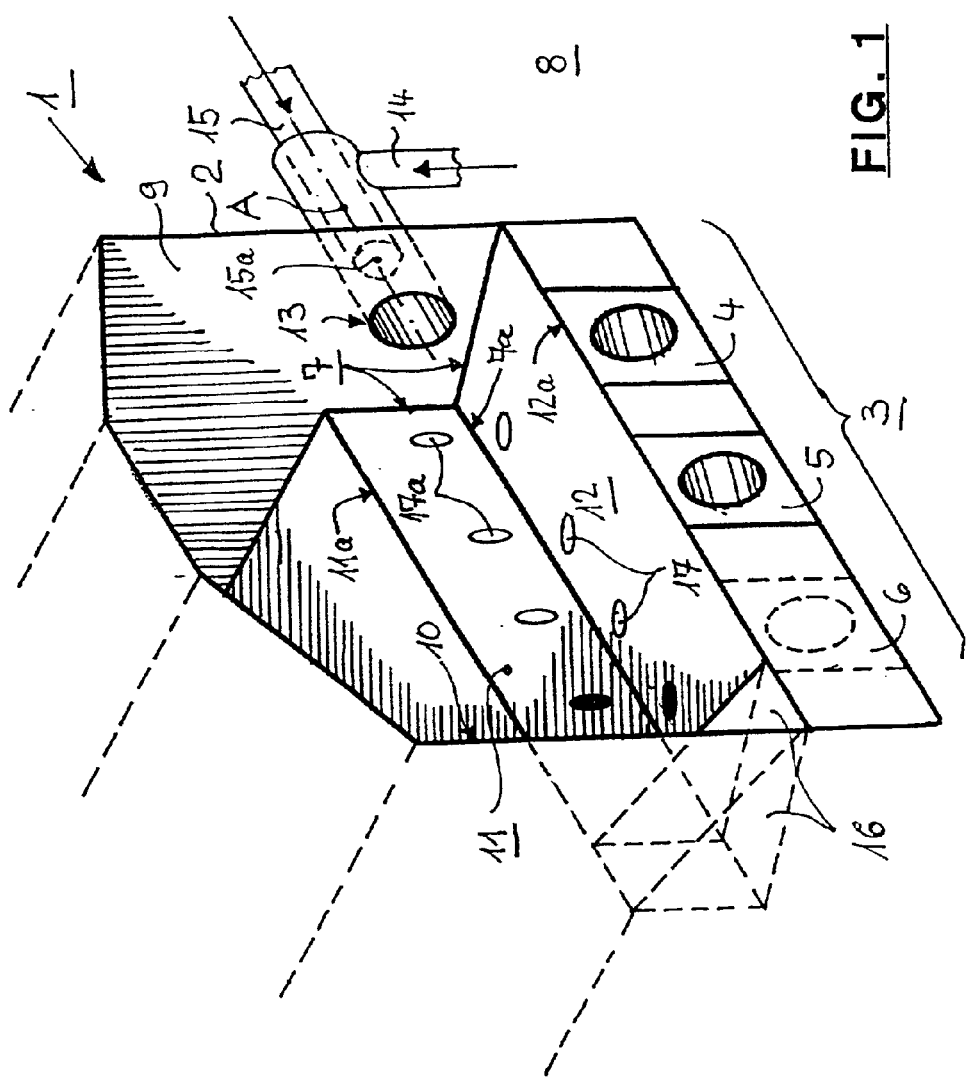
FIG. 1 illustrates a perspective view into a port neck.

FIG. 1 shows a port neck 1 with a port mouth 2 and its internal surfaces. The port neck 1 has under-port firing 3 of a known type, in which either two primary burners 4 and 5 are installed asymmetrically (offset to the outside from the furnace axis) or three primary burners 4, 5 and 6 are installed symmetrically, whereby only the corresponding burner blocks are shown. The primary burners comprise burner nozzles, not shown in the figure, installed behind these burner blocks for the so-called primary fuel, the largest portion of fuel. The under-port firing is operated sub-stoichiometrically, i.e., fuel rich, relative to the pre-heated combustion air.

The port neck 1 is connected at the back to a regenerator R1 (indicated by a dash line in FIG. 3) for the preheating of the primary oxidation gas, e.g., from combustion air that flows during the firing phase through this port neck 1 over a step 7 into the combustion chamber of a furnace (not shown). The port neck 1 has an outer side wall 9 and an inner side wall 10, both of which also form the boundaries of the step 7. A secondary burner 13 is installed in the outer side wall 9 in the vicinity of the step 7, which has a step bottom 7a, a vertical wall face 11 with a horizontal upper edge 11a and a horizontal bottom surface 12 with a horizontal front edge 12a. This secondary burner 13 is supplied with secondary fuel from a supply pipe 14 and represents the so-called "cascade burner" relative to the under-port firing 3. The proportion of fuel, the cascade burner fuel, supplied to the secondary burner 13, amounts to between 5 and 30% of the total fuel consumption.

An oxidation gas lance 15, for the supply of secondary oxidation gas (air, oxygen-enriched air or pure oxygen), is installed coaxially in the secondary burner 13. In the case illustrated, the axis "A" of the secondary burner 13 and oxidation gas lance 15 runs parallel to the wall and bottom surfaces 11 and 12 of the step 7. When air is supplied through the oxidation gas lance 15, a ratio of the air quantity amounts to between 0.5 and 1.5, preferably 1.0 of the cascade fuel. For example, for stoichiometric combustion of natural gas with air, the ratio of the air quantity should be about 1.0. Therefore sub-stoichiometric combustion (fuel rich) takes place in the flame root, i.e., at the outlet of the secondary burner 13 and shortly afterwards. This sub-stoichiometric combustion only changes to over-stoichiometric combustion (oxygen-rich) when influenced by the preheated primary oxidation gas from the regenerator that flows over the step 7 and partly also enters the step 7 as a result of eddies. The ratio of the oxygen supplied through the oxidation gas lance 15 to that of the oxygen contained in the regenerator air should be between about 0.5 and 2.5 volume percent.

Only the combination and mixing of the flames from the under-port firing 3 on the one hand, and from the secondary burner 13 on the other, along the continuing path of the flame leads to more or less stoichiometric completion of the combustion. Sub-stoichiometric conditions exist in the core areas of both the primary and the secondary flames, so that the flame core temperatures are greatly reduced, resulting in a significant reduction in the formation of nitrogen oxides.

The step 7 now has the decided advantage that the cascade flame, which already has a low linear momentum as a result of the low oxidation gas quantity relative to the primary oxidation gas from the regenerator R1, is protected in the lee of the step and is able not only to extend across the width of the port neck but is also diverted into the combustion chamber 8 from the start. This results in the formation of a broad, flat flame under over-stoichiometric conditions. Furthermore, the secondary oxidation gas, supplied through the oxidation gas lance 15, that initially enters the step area within the annular fuel gas flow, also has an effect in that it assists in preventing or suppressing soot formation.

In order to prevent the cascade flame from impinging on the side wall 10 opposite the secondary burner 13 in port neck 1, a refractory block 16, which can be wedge-shaped, is installed inside and at the end of the step 7. This refractory block extends from the top edge 11a to the front edge 12a of the step 7.

If now, after a firing cycle of 20 minutes for example, the firing direction is reversed, by switching off the gas supply to the under-port firing 3 and the secondary burner 13, the cascade burner, whereas secondary oxidation gas, which is cold at first, is still supplied to the oxidation gas lance 15, then this oxidation gas not only prevents overheating of the components of the port neck 1 and the secondary burner 13, but also oxidizes some of the soot deposits present. Furthermore, the supply of oxidation gas to the furnace waste gases that are drawn off, results in afterburning of CO and other carbon compounds, before the furnace waste gases flow into the regenerator R1, which is a very important advantage.

A further advantage lies in the fact that the supply of additional secondary oxidation gas in the vicinity of the step 7 results in an increase in the energy transfer in the batch and/or cullet charging area of the furnace, thereby increasing the specific melting capacity (pull) of the furnace.

FIG. 1 shows two further alternative and/or additional measures for supplying secondary oxidation gas: openings 17 for the supply of secondary oxidation gas are provided in the bottom 12 of the step 7 close to the wall face 11. These openings 17 are operated in a similar way to the oxidation lance 15. As a result, a screen of oxidation gas is created in front of the wall face 11 of the step 7, which has an analog effect on any possible soot and/or graphite deposits and on CO and other carbon compounds. In addition it is possible to provide openings 17a in the wall face 11 for the supply of secondary oxidation gas. Finally it is possible to add oxidation gases and fuel, preferably under sub-stoichiometric conditions, through the openings 17 and/or 17a. The openings 17a are connected to a supply pipe 22a (FIG. 2).

Figure 2:
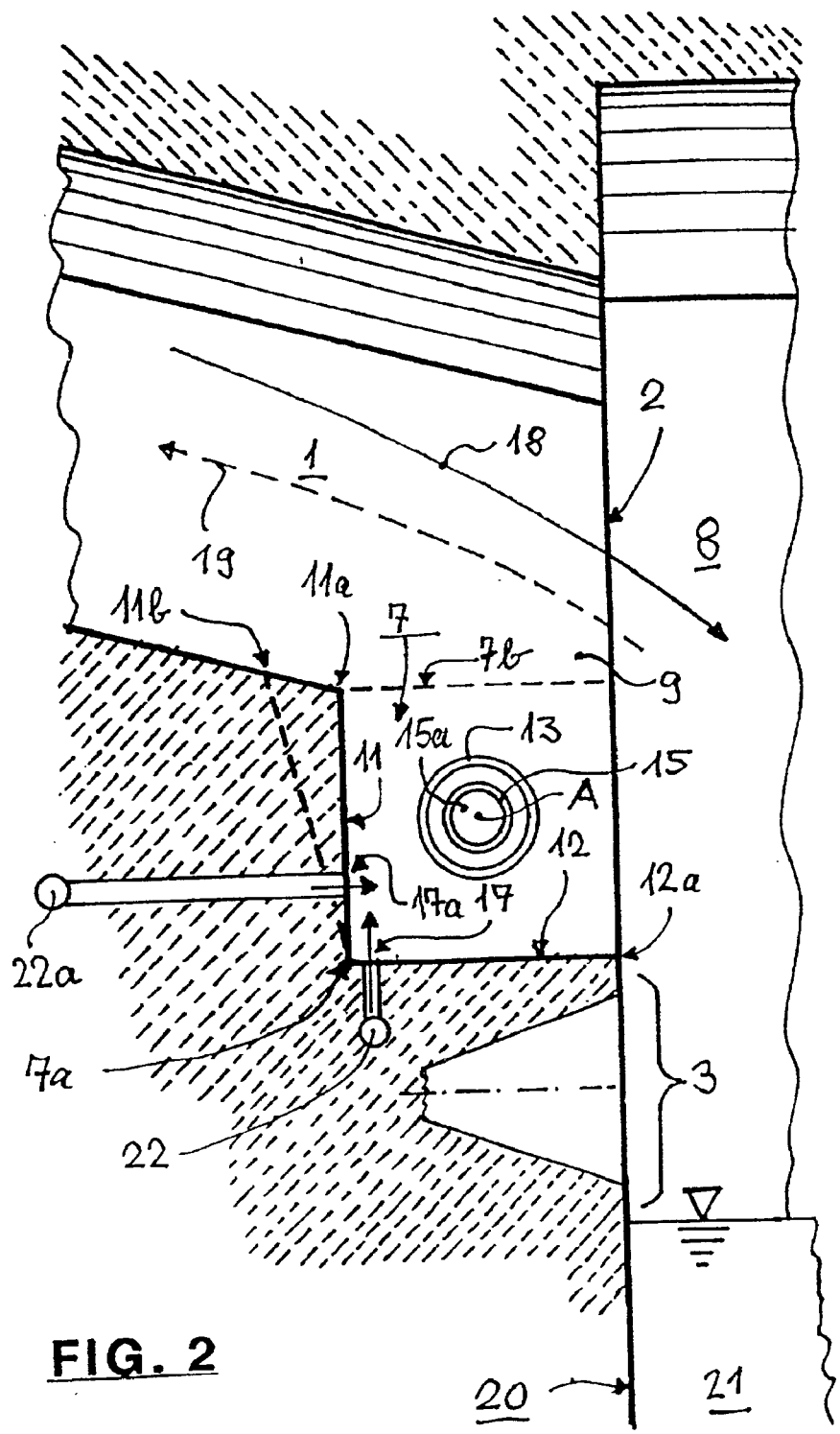
FIG. 2 illustrates a vertical section along the central axis of the port neck according to FIG. 1.

The same reference numbers are used in FIG. 2 to show the details of FIG. 1 in section. The arrow 18 gives a diagrammatic indication of the flow direction of the preheated primary oxidation gas from the regenerator R1 into the combustion chamber 8 of the furnace 20 with the glass melt 21 during the firing phase and the arrow 19 indicates the flow direction of the furnace waste gases from the combustion chamber 8 to the regenerator R1 after the firing has been reversed. The axis "A" of the secondary burner 13 and the oxidation gas lance 15, viewed towards the external side wall 9, can be placed within a rectangle inside the step 7, the upper edge 7b of which is indicated by a dash line. For the sake of simplicity vortices are not shown.

The wall face 11 need not be vertical; it can also be constructed at an angle to the vertical, as indicated by the hatched wall face 11b. Finally, it is not necessary for the axis "A" to run parallel to the wall faces 11 or 11b, or to the bottom 12; it is possible for the axis to be at an angle relative to these features. It is most important that secondary, i.e., additional, oxidation gas is supplied to the step area, as also indicated by the openings 17 and 17a, which are connected to the supply pipes 22 and 22a. It is also possible to install the secondary burner 13 and the oxidation gas lance 15 separately from one another in the side wall 9.

The step area formed by the side walls 9 and 10, the wall faces 11 and 11b and the bottom surface 12 is hereby of particular importance. This step area is open to the top and in the direction of the combustion chamber 8, whereby it is not possible to specify precise limits of the step area, as vortices can occur in the flow.

Figure 3:
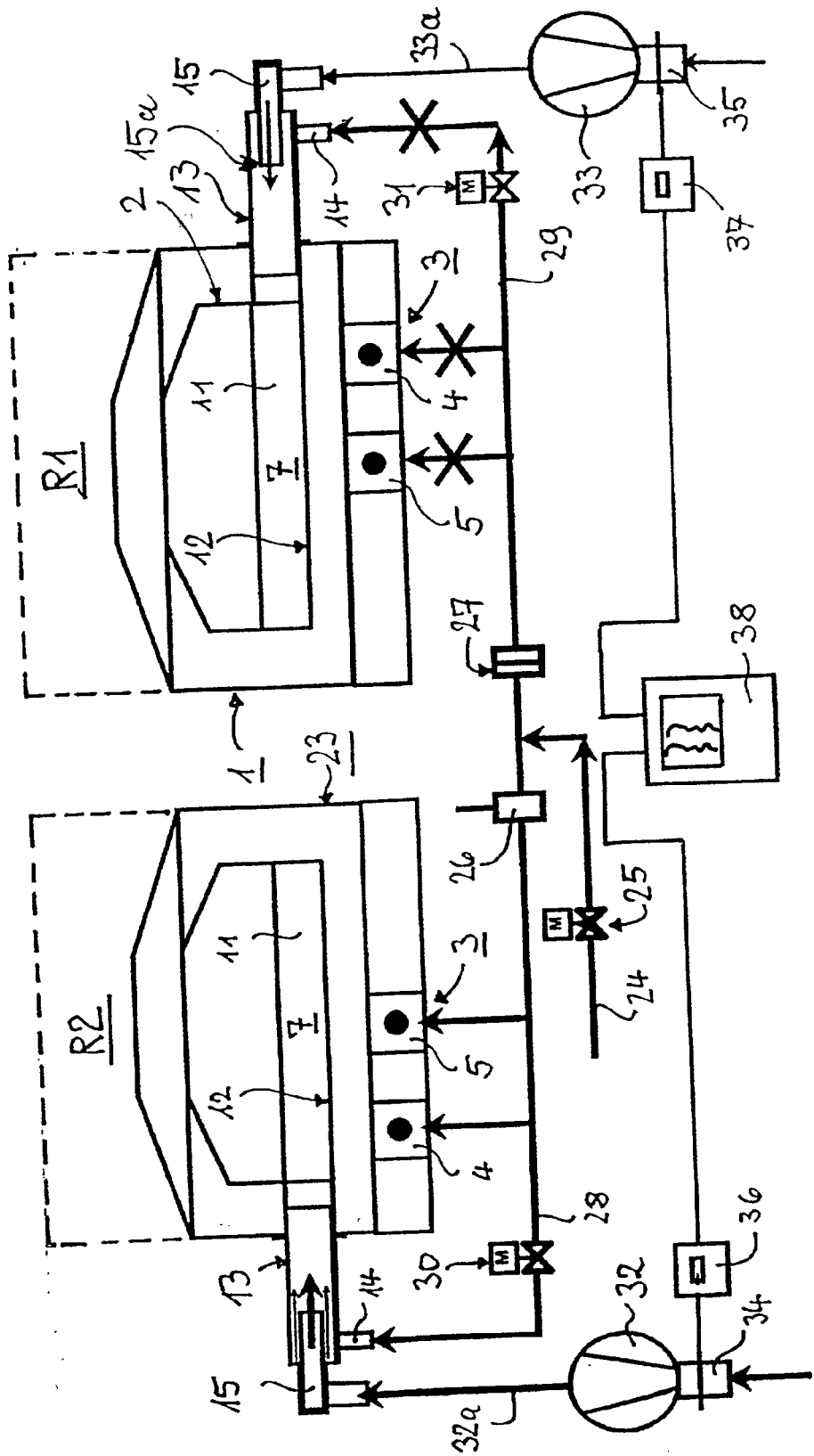
FIG. 3 illustrates a schematic front view of two port necks according to FIGS. 1 and 2 in a U-flame furnace with the relevant supply and control equipment for combustion and oxidation gases.

Some of the previous reference numbers are used in FIG. 3. On the right hand side of this figure a port neck 1, according to FIGS. 1 and 2 is shown during the exhaust phase and on the left the mirror-image installation of a port neck 23 is shown during the firing phase. The port necks 1 and 23 are connected to the regenerators R1 and R2 which are indicated by dotted lines. Gaseous fuel, e.g., natural gas, is supplied through the main gas pipe 24 and a control valve 25. Reversing valves 26 and 27 are used to alternate the fuel flow from one side to the other in a cyclic manner. Partial quantities of gas can be diverted from the under-port firing 3 through branch pipes 28 or 29 and control valves 30 or 31 to the relevant cascade burner 13. In the situation shown the gaseous fuel supply to the right hand side is cut-off completely, as indicated by the crosses.

Fans 32 and 33 are each connected to one of the oxidation gas lances 15 on each side via pipes 32a and 33a. The fan throughputs of, for example, air are determined by means of the orifice plates 34 and 35 and transmitters 36 and 37 and transmitted to and registered on a recorder 38. The amount of mixing air on the left side is normally greater than the quantity of purging air on the right hand side.

FIG. 3 shows the situation at one end of a U-flame furnace according to the foregoing description. The same also applies to a cross-fired furnace, where, for example, port necks as in FIG. 3 are installed in pairs opposite one another along the longitudinal sides of the furnace; however they can also be longitudinally offset to one another. By reversing the firing by means of a reversal system each of the port necks is alternately used as a flame source and as a waste gas return flow channel to the regenerators.

Figure 4:
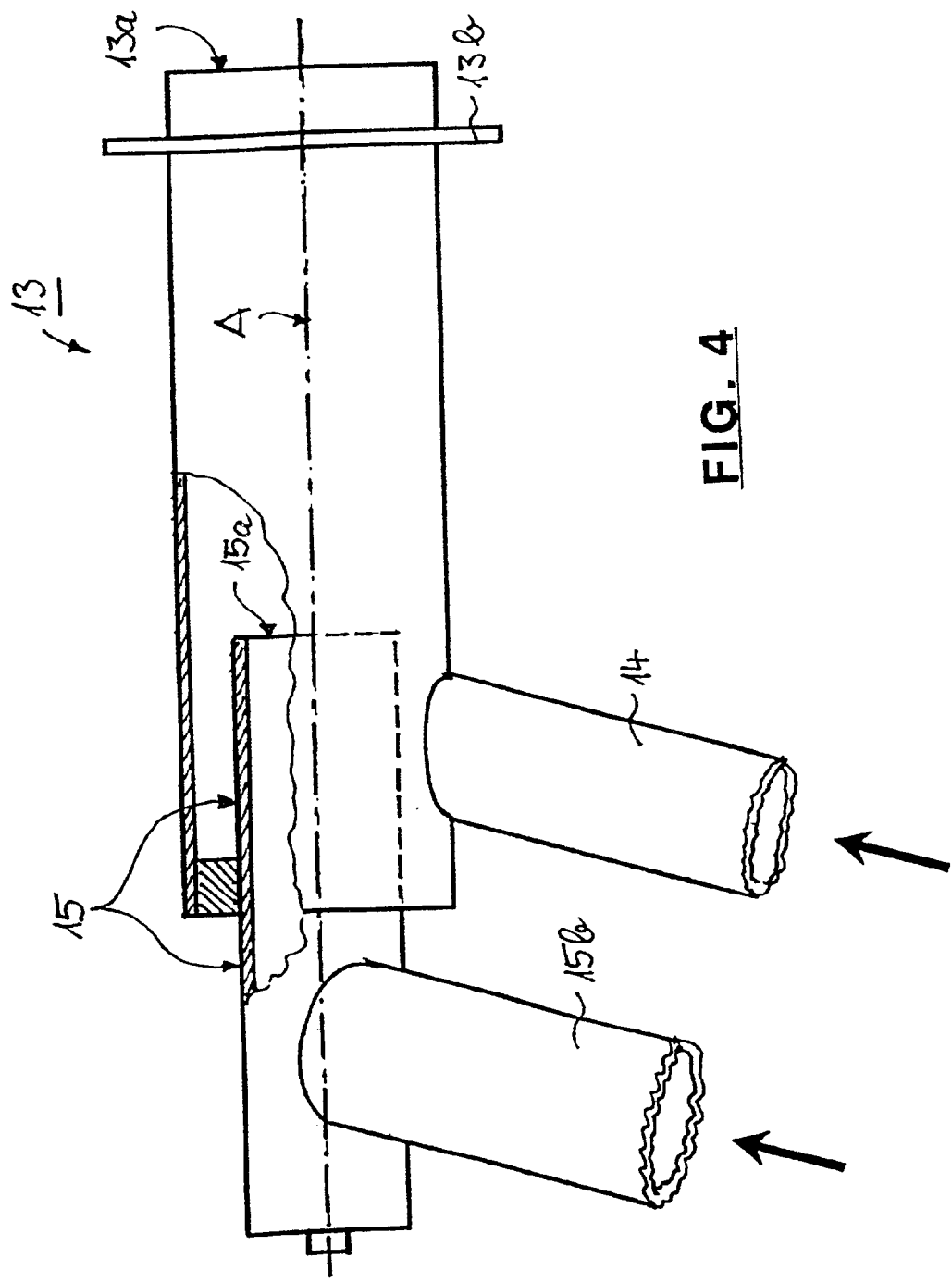
FIG. 4 illustrates a partially in section side view of a secondary burner with a coaxial oxidation lance.

FIG. 4 shows a partial section of a side view of the secondary burner 13 with the oxidation gas lance 15 shown coaxial to the axis "A". The oxidation gas lance 15 extends along the axis such that opening 15a of the lance is situated beyond the entry of the supply pipe 14 for the gaseous secondary fuel. The secondary oxidation gas is supplied through a supply pipe 15b. A sealing ring 13b is provided around the opening 13a of the secondary burner 13.

Various concepts for controlling fuel, oxidation gas (combustion air) and the temperatures in the superstructure can be used in order to limit nitrogen oxide emissions. During the firing phase the furnaces are operated under fixed fuel quantity, temperature or intelligent temperature window control. In the case of fixed fuel quantity control, the fuel quantity is maintained at a constant value. The temperature control concept controls the temperature in the superstructure, and the temperature window control system is used to control the fuel quantity when the temperature in the superstructure deviates more than a set limit value from the set point.

The following method is preferred for controlling the firing phase: the furnace was initially operated over 2 to 5 reversal cycles with temperature-dependent control of the total fuel quantity, whereby the temperatures in the superstructure were measured. The temperature set point was approximately 1600° C. When natural gas was used there were fluctuations of ±50 to 150 $Nm^3$/h. Corresponding adjustment was made to the oxidation gas quantity. The natural gas fluctuations led to instable combustion conditions and therefore the waste gas composition varied. The average values of the open cross sections of valves 25, 30, 31 were recorded. Then an automatic change to fixed fuel quantity control took place, i.e., the temperature in the superstructure was monitored and fixed fuel quantities per unit time were set and corrected from time to time. This resulted in a significant stabilization of the waste gas values for $O_2$ and $NO_x$. The $NO_x$ half-hour average values were reduced to 603 to 645 $mg/Nm^3$, the average daily value was 639 $mg/Nm^3$. Soot formation and graphite deposits were not found. The $O_2$ values were between 0.2 and 0.5%. The glass quality met requirements. From the above description, it is apparent that the objects of the present invention have been achieved. While only certain embodiments have been set forth, alternative embodiments and various modifications will be apparent from the above description to those skilled in the art. These and other alternatives are considered equivalents and within the spirit of scope of the present invention. It should be under-stood that we wish to embody within the scope of the patent warranted hereon all such modifications as reasonably and properly come within the scope of our contribution to the art.

We claim as our invention:

1. A method for heating glass melting furnaces having a combustion chamber, with regenerators for heating primary oxidation gases from the group consisting of air, oxygen-enriched air and oxygen, and port necks which open into said combustion chamber, primary burners, and secondary burners that are installed in a cascade arrangement relative to said primary burners, whereby said primary and secondary burners are operated with fossil fuels, comprising the steps of:

operating said primary burners with a larger proportion of said fuel as a primary fuel to produce flame gases under sub-stoichiometric conditions, operating said secondary burners as cascade burners with a relatively low proportion of said fuel as secondary fuel to produce flame gases under over-stoichiometric conditions, mixing together said flame gases produced so that a complete combustion process in said combustion chamber is approximately stoichiometric, supplying said secondary fuel through said secondary burners through one side wall of each port neck to a step, provided in said port neck, said step having a bottom surface and a wall face, introducing said preheated primary oxidation gases to flow from said regenerators over said step into said combustion chamber, blowing a secondary oxidation gas from the group consisting of air, oxygen-enriched air and oxygen into said step during a firing phase of each port neck, in addition to primary oxidation gas preheated in said regenerators that flow over said step.

2. A method according to claim 1, wherein in a waste gas exhaust phase of each port neck an oxidation gas from the group consisting of air, oxygen-enriched air and oxygen is also blown into said step when said secondary burner is switched off.

3. A method according to claim 1, wherein said secondary oxidation gas is blown into said step in a center of said secondary burner.

4. A method according to claim 1, wherein said secondary oxidation gas is blown into said step through said side wall outside said secondary burner.

5. A method according to claim 1, wherein said secondary oxidation gas is blown into said step through said bottom surface.

6. A method according to claim 1, wherein said secondary oxidation gas is blown into said step directly in front of said wall face.

7. A method according to claim 1, wherein said secondary oxidation gas is blown into said step through said wall face.

8. A method according to claim 7, wherein said secondary oxidation gas is also blown into the step through said bottom surface.

9. A method according to claim 1, wherein fuel is mixed with said secondary oxidation gas.

10. A method according to claim 1, wherein when gaseous fuels are used, a ratio of a quantity of said secondary fuel to said primary fuel quantity is chosen between 5 and 30 volume percent.

11. A method according to claim 10, wherein said ratio is between 10 and 20 volume percent.

12. A method according to claim 1, wherein in the firing phase an amount of oxygen in said secondary oxidation gas blown into said step and an amount of oxygen in said primary oxidation gases, preheated in said regenerators, supplied through said port neck are at a ratio within a range 0.5 to 2.5.

13. A method according to claim 1, wherein an amount of secondary oxidation gas blown into said step during said firing phase and an amount of secondary oxidation gas blown into said step during an exhaust phase are at a ratio within a range 0.5 to 1.5.

14. A method according to claim 13, wherein said ratio is between 0.8 and 1.2.

15. A method according to claim 1, wherein a quantity ratio of said secondary oxidation gas is adjusted by variable fans.

* * * * *